T. B. De FOREST.
Sockets for Agricultural Implements.
No. 152,085.          Patented June 16, 1874.
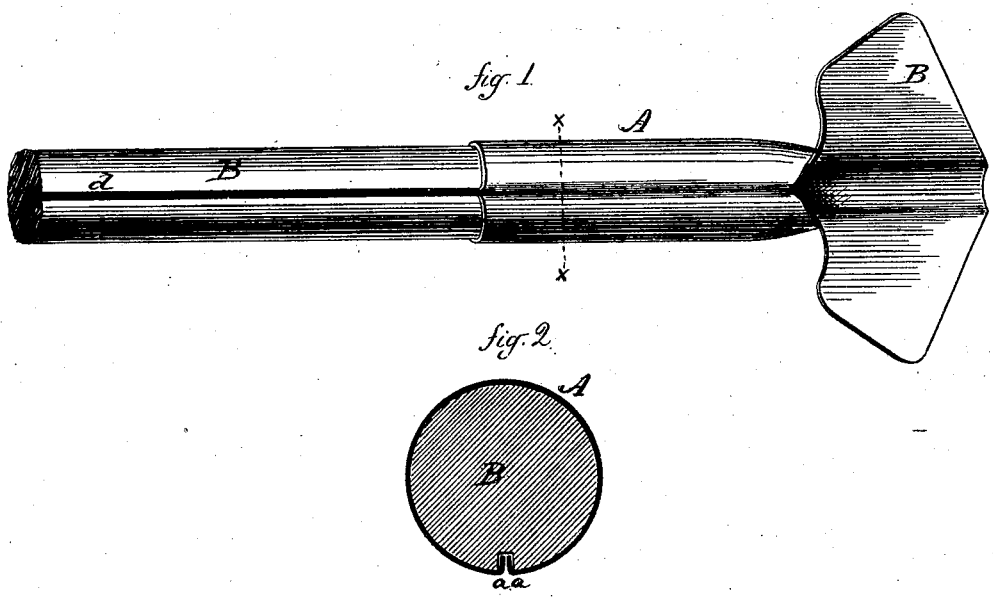

UNITED STATES PATENT OFFICE.

THOMAS B. DE FOREST, OF BIRMINGHAM, CONNECTICUT.

IMPROVEMENT IN SOCKETS FOR AGRICULTURAL IMPLEMENTS.

Specification forming part of Letters Patent No. 152,085, dated June 16, 1874; application filed April 10, 1874.

*To all whom it may concern:*

Be it known that I, THOMAS B. DE FOREST, of Birmingham, in the county of New Haven and State of Connecticut, have invented a new Improvement in Sheet-Metal Socket for Shovels, &c.; and I do hereby declare the following, when taken in connection with the accompanying drawings, and the letters of reference marked thereon, to be a full, clear, and exact description of the same, and which said drawings constitute part of this specification, and represent in—

Figure 1 a top view, and in Fig. 2 a transverse section on line *x x*.

This invention relates to an improvement in the manufacture of shovels, spades, scoops, hoes, and other articles, which are usually constructed with a socket, into which the handle is set; the object being to produce a strong socket for these and analogous articles from light sheet metal without welding or riveting; and the invention consists in a socket, formed from sheet metal, the two edges turned down and embedded in the handle, whereby the handle is prevented from turning in the socket, and the two edges of metal secured around the handle so as to prevent the socket from opening.

A is the socket, cut from a blank of sheet metal of an extent proportionate to the diameter of the socket, and with a heading, B, adapted for attaching the socket to shovels, hoes, or analogous articles, as the case may be. The width of the blank for the socket should be a little wider than the circumference of the socket, so that if brought to its diameter one edge will overlap the other. The two edges are turned inward, as at *a a*, Fig. 2, into a previously-prepared groove in the handle, or through sufficient power forced or embedded into the wood of the handle B. This prevents the socket from opening, and also prevents the socket from turning upon the handle.

The handle may be previously prepared with a groove, *d*, and inserted into the socket, the groove serving to properly locate the handle, as well as to hold the socket.

This avoids the usual welding or riveting, and makes a most complete and perfect socket, cheap in its construction.

I claim as my invention—

A handle-socket for shovels, hoes, or analogous articles, formed from sheet metal, the edges turned inward, so as to enter or be embedded into the handles, substantially as described.

THOMAS B. DE FOREST.

Witnesses:
A. J. TIBBITS,
J. H. SHUMWAY.